June 3, 1930. A. C. HARDY ET AL 1,761,725
METHOD OF AND APPARATUS FOR PRODUCING STANDARD ILLUMINATION
Filed July 12, 1927
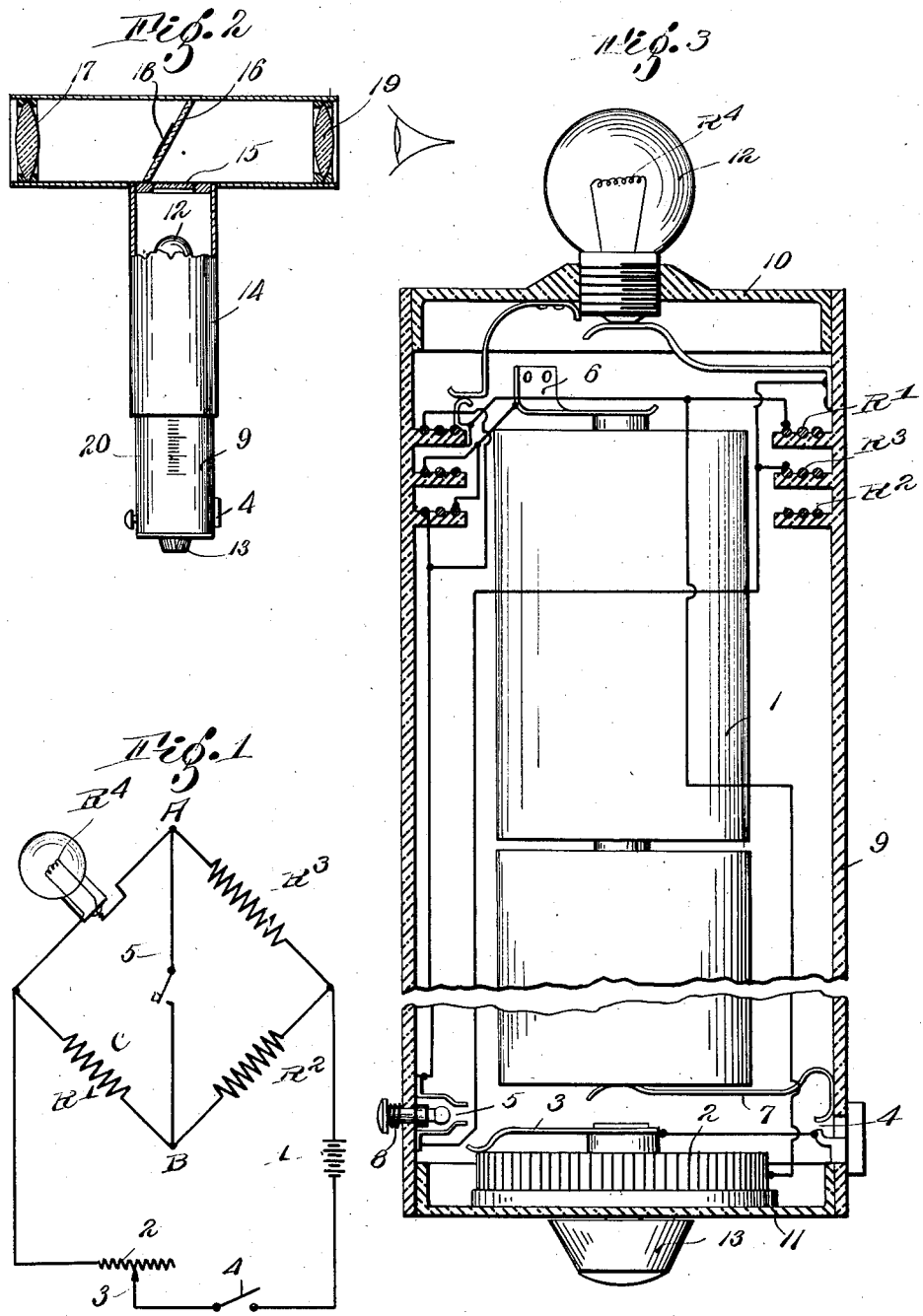
Inventors,
Arthur C. Hardy,
Frederick W. Cunningham,
by Roberts Cushman Woodbury
Attys.

Patented June 3, 1930

1,761,725

UNITED STATES PATENT OFFICE

ARTHUR C. HARDY, OF WELLESLEY, MASSACHUSETTS, AND FREDERICK W. CUNNINGHAM, OF STAMFORD, CONNECTICUT, ASSIGNORS TO GENERAL ELECTRIC COMPANY, A CORPORATION OF NEW YORK

METHOD OF AND APPARATUS FOR PRODUCING STANDARD ILLUMINATION

Application filed July 12, 1927. Serial No. 205,108.

The invention relates broadly to the art of photometry and in particular to a method of and an apparatus for producing standard illumination.

Prior art has evolved several methods for determining the intensity of light derived from a given source, perhaps the most common being that of visually comparing the light of unknown intensity with one whose luminosity is standardized by a particular manufacturing process, e. g. a candle made in accordance with fixed specifications or an electric lamp lighted by a current which is controlled with the aid of suitable observing instruments. While these prior methods are sufficiently accurate, they are in the nature of laboratory methods and employ expensive and cumbersome equipment.

One of the most useful fields for the employment of photometry is that of photography, in which, for successful results the length of exposure and/or lens aperture must be determined with reference to the light intensity at the time of exposure. As light intensity is a factor which is extremely difficult to determine visually, the usual method of guessing at the amount of light, which is employed by the amateur photographer, and often by the professional, does not always bring the exposure within the relatively wide range permissible with modern photographic plates and films so that the results are not always such as might be desired.

An inexpensive readily portable photometer would thus be highly useful to the photographer, whether professional or amateur, while an instrument of this type would be eagerly received in the important field of illuminating engineering.

It is recognized that so-called portable photometers are available commercially, but such prior instruments require much auxiliary equipment, such for example, as storage batteries, ammeters and other heavy, bulky or expensive electrical devices.

The conventional way of comparing two light intensities consists in allowing the light from the source of unknown intensity to fall on a screen which fills a certain fraction of the field of view as seen through the eye piece of the instrument. Light from a standard source of illumination fills the remainder of the field of view. Suitable means is provided for altering the brightness of the portion of the field illuminated by the standard, as for example, by moving the standard, but whatever mode of comparison be employed, it is obviously essential that the intensity of the standard be substantially constant.

It is well known that if an incandescent electrical lamp be operated at a constant voltage across its terminals, the current through the lamp remains practically constant throughout the useful life of the lamp, gradually diminishing toward the end of its useful life. Thus since throughout substantially all of the useful life of the lamp the current remains constant when a given voltage is applied to the lamp terminals, it is evident that the resistance of the lamp is likewise substantially constant. These properties of incandescent lamps are often employed to maintain a constant luminous intensity, either by operating the lamp at a constant voltage as indicated by a voltmeter; at a constant current as indicated by an ammeter; or in a constant resistance circuit controlled by a Wheatstone bridge arrangement with a balance point indicated by a galvanometer. All three of these methods of control require electrical indicating devices which are bulky, expensive and extremely delicate, and so far as is known to us no simple and inexpensive means has heretofore been devised for controlling the intensity of a standard lamp suitable for use in a portable photometric apparatus.

In accordance with our present invention we have provided a simple method of and apparatus for maintaining a constant intensity in a standard source of illumination, for example, an incandescent electric lamp. This novel method and apparatus does not necessitate the use of nor include expensive and bulky electrical indicating devices, thus making possible small, cheap and portable voltmeters well adapted for use by amateur photographers, illuminating engineers, and others who demand an instrument of light weight and small bulk at a minimum expense.

In the accompanying drawings we have diagrammatically illustrated by way of example an electrical circuit suitable for use in the practice of our method together with apparatus embodying the principle of our invention as applied to a portable photometer.

In the drawings,

Fig. 1 is a diagrammatic view of an electric wiring network adapted for use in the practice of our method;

Fig. 2 is a side elevation, partly broken away and partly in section, showing the application of our invention to a small self-contained portable photometer; and Fig. 3 is a vertical section, to large scale showing the lower section only of the device of Fig. 2 and illustrating one possible practical arrangement of the electrical circuit.

In Fig. 1, we have shown a network of electrical wiring comprising two branches in parallel across a source of current 1 of potential sufficient to incandesce the filament constituting the light source, said potential being controlled by an adjustable rheostat comprising resistance 2 and movable contact member 3 having an actuating knob 13. To conserve the battery while the apparatus is not in use the circuit may be opened at switch 4. As will be noted, the parallel branches form a bridge having for arms the resistances R1, R2, R3, and the filament R4 of the lamp; the resistances bear magnitude in definite proportion with one another to effect electrical balance under conditions explained hereinafter. Across one diagonal intersecting each pair of resistances and terminating in points A, B there is connected key switch 5.

The method of obtaining balance is by closing and opening key 5 and adjusting contact 3 until the lamp no longer flickers at the depression and release of the key, i. e. until the current remains constant. The amount of adjustment of the rheostat contact 3 depends upon the potential available at the particular moment. To effect balance when measuring by bridge connection, the resistances must be related according to the well-known equation:

$$R_1R_3 = R_2R_4.$$

With $R_1$, $R_2$ and $R_3$ fixed, it becomes simply a matter of varying $R_4$ to fulfill the relation. Now, it is known that practically all metals, commonly employed as filament material, exhibit in more or less degree changes in magnitude of resistance in response to variations of current passing therethrough. As illustrative of a most pronounced example in this respect, mention need be made only of iron in its use as ballast resistance so-called, although the same characteristic is present in every metal; our invention contemplates all suitable metals and in particular those of the refractory group, e. g. tungsten, molybdenum, etc. Hence, it is feasible to regulate the resistance of $R_4$ by varying the amplitude of current through the member in manner such that the mathematical relation set forth is satisfied if the remaining arms are in proper proportion. The function of key 5 primarily is to determine whether or not points A and B, located at the diagonal points of the bridge, are equi-potential, a condition requisite for balance, depending in turn upon the magnitude of applied electromotive force.

Having measured by ammeter or otherwise, the amplitude of current traversing the standard filament under the conditions stated, the current will register an equal amount at a subsequent balance, either when testing the same lamp or having replaced the standard by another of similar type. The bridge thus furnishes a precise mode of comparing successive operations of a given lamp or a number of luminaries, one of which may be selected as standard; the comparison by the bridge method determines the factors of current and illumination intensities precisely, and at the same time requires no delicate meters after the first calibration, indeed not even then unless a measure of the energy in volts and/or amperes is desired.

Fig. 3 shows the photometer apparatus (very much enlarged) complete in compact, portable form, the various elements corresponding to those in Fig. 1 being designated by similar reference characters. As shown, the battery is a standard flash light cell in multiple section, the upper and lower terminals contacting with metallic springs 6 and 7 respectively, secured in suitable manner to the container. Switch 4 is a slide, the circuit being completed between a metallic tip projecting from the slide and a portion of constant spring 7. Key 5 is a sliding rod having an actuating button, and is held in normal position by the action of coil spring 8. While the position of the fixed resistances is dictated primarily by the shape and size of container, we find it convenient to form them as annular coils disposed on circular shelves formed integral with the container. The latter comprises cylindrical casing 9 of insulation material, preferably of a phenolic condensation product as bakelite, the ends of which are closed by cover 10 and bottom 11. In the cover, provision is made for the insertion of a lamp 12, while the bottom supports the rheostat and adjustment knob 13.

In the embodiment shown in Fig. 3, the device is well adapted to constitute an element of a portable photometer such as shown in Fig. 2. This photometer in its general features is of a well known type comprising an upper part or telescope and a lower tubular part 14 which forms a handle and which also provides a housing for the standard lamp. As here shown, the casing 9 above described telescopes within the tubular handle 14. Suitable means, for example resilient or frictional engagement of the parts, may be provided to retain them in adjusted position and if desired some accurate means of relatively adjusting the parts may be provided, for example a rack and pinion, but as such adjusting means is common in photometers of this type we have not shown it herein.

The light emitted from the lamp 12 passes through a glass plate 15, preferably frosted, and falls upon an inclined mirror consisting of a silvered disk 18 upon the inclined glass plate 16 extending transversely of the upper part or telescope of the apparatus. From this inclined mirror 18 the rays of light are reflected along the axis of the telescope toward the eye-piece 19. The light from the source whose intensity is to be measured enters through the object glass 17 and forms an annular area of illumination surrounding the central disk of light reflected by the mirror 18.

In using the device the operator first closes switch 4 and then, while looking through eye-piece 19, presses the button of switch 5 and, looking at the light reflected from the mirror 18, notes whether as the button of switch 5 is depressed and released the light winks (either decreases or increases in brightness). If the light does wink when the button is depressed, the operator adjusts rheostat knob 13 in one direction or the other and again depresses the button of switch 5 and notes the results. So long as the light winks when the button is depressed, the operator continues to adjust the rheostat, but when after a series of adjustments, if necessary, the light no longer flickers or winks when the switch 5 is closed, the operator knows that the light is of standard intensity. He now directs the object glass 17 toward the light to be compared. By observation of the relative brightness of the central disk of reflected light and the surrounding annulus, he is able to determine whether or not the light being observed is of greater or less intensity than the standard. If it is not of the same brightness, he adjusts the case 9 in or out of the tube 14 until the central spot of light and the surrounding ring of light, as seen through the eye-piece 19, are of the same apparent brightness. He now notes the position of the case 9 with respect to the tube 14 as conveniently shown by graduations 20 on the case 9. These graduations may indicate the relative light intensity, from which the user may draw such conclusions as are appropriate to the situation, or if desired when the photometer is intended primarily for photographic use, the graduations may indicate directly the proper shutter speed and lens aperture.

The entire photometer thus constructed may be of convenient size to hold in one hand and may be very light in weight and relatively cheap to construct. At the same time it provides an accurate method of determining light intensity so that the photographer, using such an instrument, is in a position to adjust his lens aperture or shutter so as to obtain the best possible results.

While as above stated this device is particularly useful for photographic work, it is obvious that it may be used for other purposes and we do not intend to restrict ourselves to the use of this device for photography or, in respect to our method of providing a standard light intensity, to the use of such method in a photometer of the type here shown or in fact to use in any kind of photometric apparatus.

We claim:

1. Apparatus of the class described comprising a Wheatstone bridge having an electric lamp in substitution for one of the usual resistance arms and a switch in substitution for the usual galvanometer, a source of electric current, and means for adjustably varying said current.

2. A device of the class described comprising an electric lamp constituting one of the resistance arms of a Wheatstone bridge, a switch key in substitution for the usual galvanometer of the bridge, means for supplying current to the bridge, and a variable resistance in series with said source of current supply.

3. A device of the class described having a standard source of light, said standard source comprising a Wheatstone bridge one arm of which comprises an incandescent lamp forming the light source, said bridge having a switch in substitution for the usual galvanometer, a source of current, and a rheostat for varying the current from said source through the bridge.

4. In an energized bridge arrangement, one arm of which comprises an incandescent resistance forming the filament of a lamp, the method of balancing the bridge which comprises intermittently short circuiting opposite terminals of the bridge which are equipotential under conditions of balance and gradually varying the current through the network until the incandescent resistance remains at uniform brilliance during a time period embracing that of the short circuit.

5. That method of obtaining a light of standard intensity which comprises substituting an electric lamp for one of the usual resistances of a Wheatstone bridge, substituting a switch for the usual galvanometer of such bridge, alternately closing and opening said switch, and varying the current supplied to the bridge until upon opening and closing of the switch the lamp ceases to wink or vary in intensity.

6. That method of obtaining a standard light source by the use of a Wheatstone bridge having an incandescent lamp in substitution for one of its usual resistances and a switch in substitution for the usual galvanometer, said method comprising supplying current to the bridge, opening and closing said switch while noting any change in the brightness of the lamp as the switch is closed and opened, and adjusting the current until no such change in brightness of the lamp accompanies opening and closing of the switch.

Signed by us at Boston, Massachusetts, this 26th day of May, 1927, and at Connecticut, this 29th day of June, 1927.

ARTHUR C. HARDY.
FREDERICK W. CUNNINGHAM.